Jan. 27, 1953   T. M. DATE   2,626,505
HOIST
Filed Oct. 19, 1951   2 SHEETS—SHEET 1
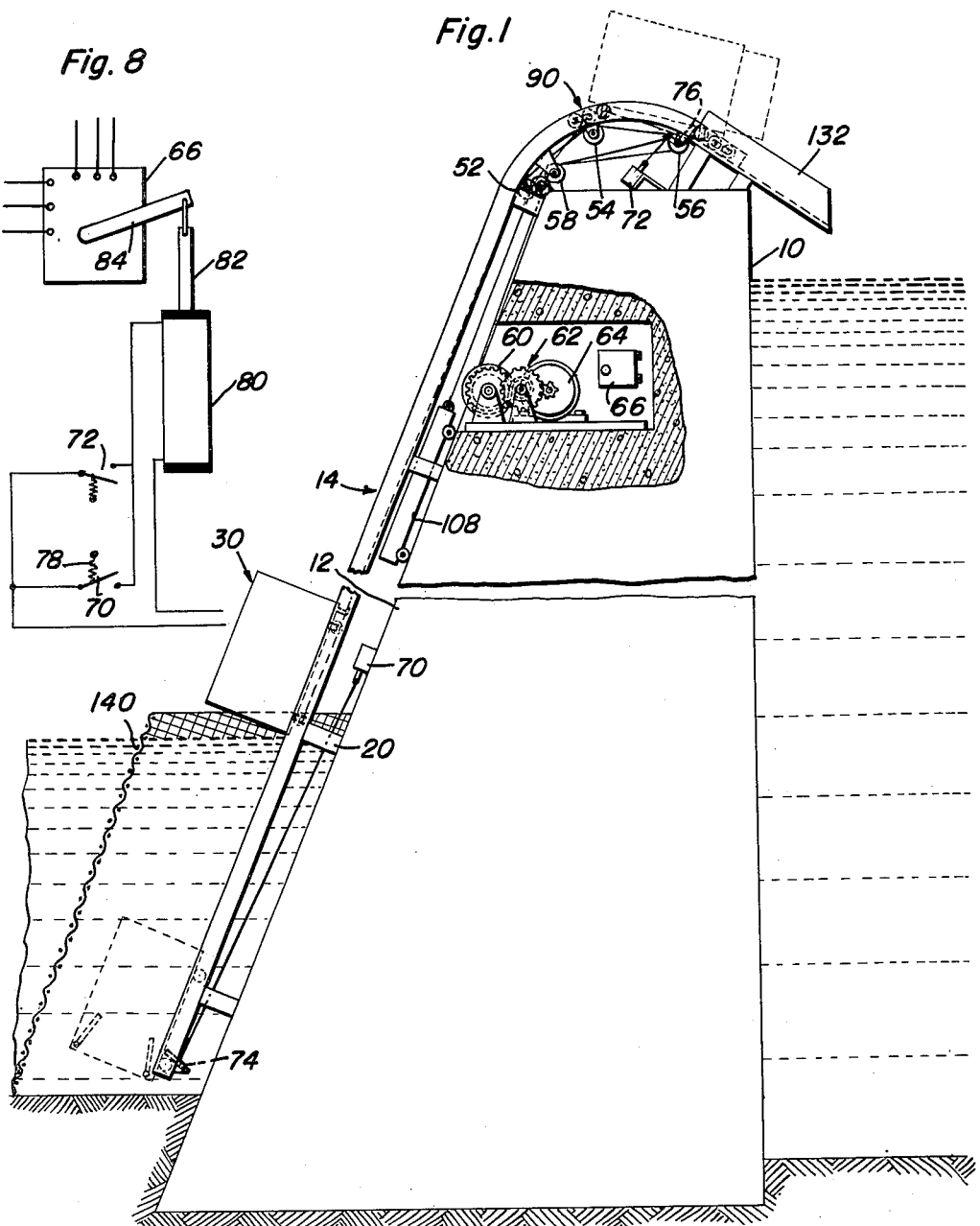
Tod M. Date
INVENTOR.
BY *Clarence A. O'Brien*
*and Harvey B. Jacobson*
Attorneys Jan. 27, 1953     T. M. DATE     2,626,505
HOIST
Filed Oct. 19, 1951     2 SHEETS—SHEET 2
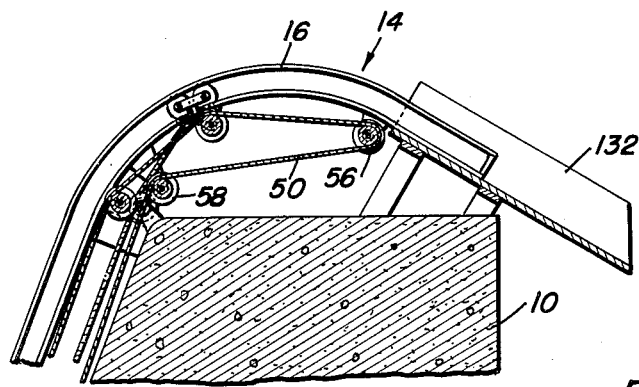
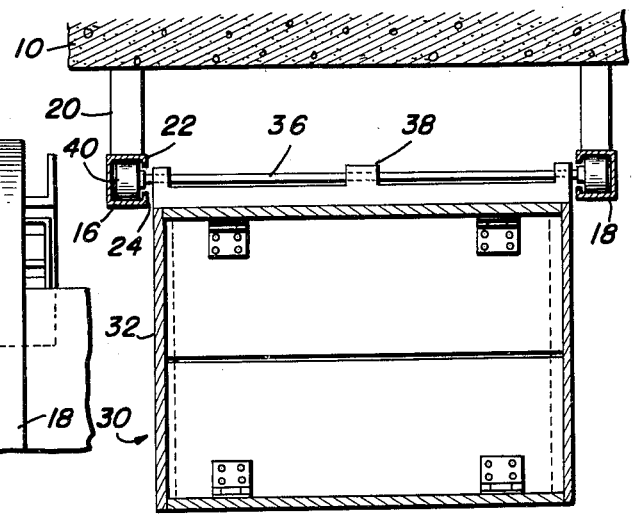
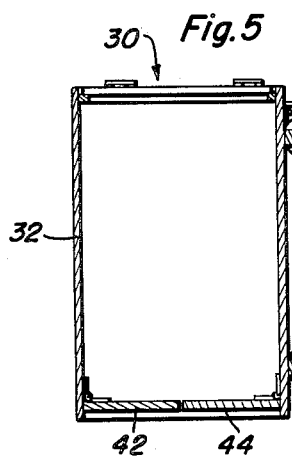
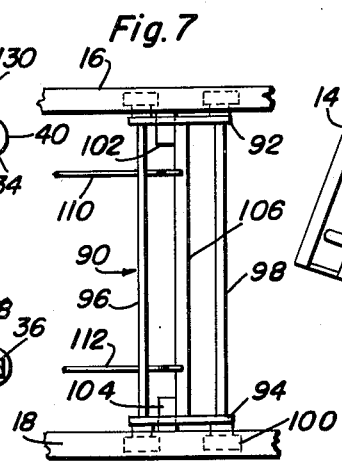
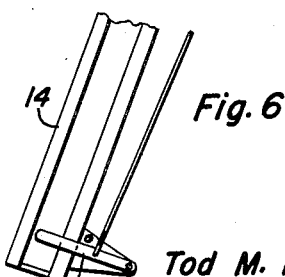
Tod M. Date
INVENTOR.

Patented Jan. 27, 1953

2,626,505

UNITED STATES PATENT OFFICE 2,626,505

HOIST

Tod M. Date, Seattle, Wash., assignor of one-third to Roy M. Date, Friday Harbor, Wash.

Application October 19, 1951, Serial No. 252,084

8 Claims. (Cl. 61—21)

This invention relates to a hoist and particularly for a hoist for lifting fish over a dam.

The construction of dams in our western streams have so disrupted the fish population and particularly the salmon population that it has been found necessary to provide means for hoisting the fish over the dams so that they may continue to the up water branches of the rivers to do their spawning. Many arrangements have been arranged for lifting the fish over the dam but none have been quite satisfactory particularly for high dams.

The present invention provides a skip hoist for lifting fish from a trap at the base of the dam to a chute so that they may be deposited in the waters above the dam. A skip hoist is used having substantially solid side walls and a trap door in the bottom so that the fish may be concentrated in a trap at the base of the dam and the skip lowered over the fish which are admitted through the trap door which then closes to substantially enclose the fish in the skip. An electrical motor drives the winch which winds up a cable to lift the skip up the track and over the dam into dumping position. Since the tops of dams are of considerable width it is generally necessary to curve the track a sufficient distance the skip will be stranded on the curved portion of the top of the trap and rest means are provided to propel the skip off of the top.

The present invention provides an electrical motor for driving a hoist for lifting the skip from the bottom of the track to the top and dumping the same. After which a weight operated carriage propels the skip off of the top after which it drops by gravity down the track to be refilled.

It is accordingly an object of this invention to provide an improved fish hoist.

It is a further object of this invention to provide a hoist having automatic means for filling it with fish.

It is a further object of this invention to provide a hoist having power means for lifting and dumping the skip and gravity operative means to return the skip to the bottom of the track.

It is a further object of this invention to provide a gravity biased carriage for removing the skip from the hump of the track.

Other objects and many of the attendant advantages of this invention will be apparent from the following detailed description taken in conjunction with the accompanying drawings in which:

Figure 1 is a side elevation of the hoist in position on a dam, parts of the dam broken away and in section to show portions of the hoist;

Figure 2 is an enlarged detail section of the top of the track;

Figure 3 is an enlarged front elevation of the curved top of the track;

Figure 4 is an enlarged cross section through the skip taken substantially on the plane indicated by the line 4—4 of Figure 5;

Figure 5 is a vertical section of the skip taken substantially on the plane indicated by the line 5—5 of Figure 4;

Figure 6 is a fragmentary view showing the lever at the bottom of the track;

Figure 7 is an enlarged fragmentary view showing the carriage mounted in the track;

Figure 8 is a schematic wiring diagram of the start and stop control.

In an exemplary embodiment of the invention, the dam 10 has a downstream face 12 which is generally inclined away from the vertical. A track 14 comprising a pair of rails 16 and 18 of channel construction is mounted on the face of the dam 12 by means of brackets 20. The channel rails 16 and 18 are provided with in-turned lips 22 and 24 for a purpose presently to be described.

A skip 30 having substantially impervious side walls 32 is mounted on the track 14 by means of a pair of axles 34 and 36 journalled in bearing blocks 38 attached to one side of the skip 30. The axles 34 and 36 are provided at each end thereof with rollers 40 which are received in the tracks 16 and 18 and retained therein by means of the lips 22 and 24. The bottom of the skip 30 is provided with a pair of trap doors 42 and 44 hinged on the side wall 32 and so positioned that when the skip is lowered into the water the water pressure will open the doors 42 and 44 and admit fish and water and other materials within the trap to be entrained within the skip 30. The trap doors 42 and 44 will close either of themselves or when the skip is moved by the pressure of the water within the skip. A cable 50 is connected to the front end of the hoist and entrained over sheaves 52 and 54 placed under the track and adjacent to the curve thereof and over a sheave 56 at the upper end of the curved portion of the trap 14 and back over a sheave 58 and is mounted on a drum 60 of a winch 62. The winch 62 is driven by an electric motor 64 and is controlled by a control switch 66 limit switches 70 and 72 are operated by means of limit levers 74 and 76. The limit lever 74 is placed adjacent the bottom of the track 14 and extends into the path of the skip so when the skip 30 is lowered to the bottom of the track it will depress the lever 74 closing the switch 70 against the spring 78 so that will energize an actuating mechanism 80 to move a plunger 82 to displace the lever 84 of the starting switch 66 and thereby energize the motor 64. The limit lever 76 is placed adjacent the top end of the track 14 and actuates stop switch 72 which energizes actuating means 80 to again operate the plunger 82 and move the lever 84 to deenergize the motor 64.

Since the track 14 curves substantially over the top of the dam it provides a hump or flat portion at the top end of the track so that when the skip is moved to the top end of the track it is then incapable of being moved therefrom by gravity. Accordingly, there has been provided a means for propelling the skip 30 backwards over the hump so that it will descend the track 14 under the effects of gravity. While obviously many means could be employed for removing the skip backwards over the hump this invention provides a carriage 90 having end plates 92 and 94 on which is mounted a pair of axles 96 and 98, the axles 96 and 98 carrying rollers 100, similar to the rollers 40 and likewise engaged within the channel tracks 16 and 18 so that the carriage 90 is retained within the tracks 14. The stop members 102 and 104 are rigidly connected to the track 16 and 18 and the carriage 90 is provided with a dependent bar 106 which engages with the stops 102 and 104 to limit the travel of the carriage along the tracks 14. The carriage 90 is biased against the stops 102 and 104 by means of a weight 108 mounted for travel on the face 12 of the dam. The weight 108 is connected to the bar 106 by a pair of cables 110 and 112. The cables 110 and 112 are entrained on sheaves 114 and 116 mounted on the rod 118 on which is mounted the sheave 54 for the skip 30 likewise the cables 110 and 112 are mounted in sheaves 120 and 122 mounted on the rod 124 also mounting the sheave 52 for the main cable 50. The skip 30 is provided with a depending hook 130 for engaging the axle 96 on the carriage 90 so that the skip propels the carriage against the bias furnished by the weight 108 thus causing the weight 108 to travel up the face of the dam while the carriage is propelled from the position of the stop 102 to the end of the track 14.

The skip 30 when its moves on to the curved portion of the track 14 dumps its contents into a chute 132 mounted on the top of the dam 10 and enclosing a portion of the end of the track 14.

In the operation of the hoist the fish are caught and moved into a concentrated position by means of a trap 140. The skip 30 is lowered by gravity into the water in the trap 140 and the water in the trap 140 lifts the trap doors 42 and 44 of the skip 30 so that the fish may pass inside the body of the skip. As the skip approaches the bottom of the track 14 it will actuate the lever 74 to close the starting switch 70 which will energize the actuator 80 and start the motor 64. The motor 64 will drive the winch 62 so that the cables 50 will be wound on the drum 60 and the skip will travel up the track 14 until it engages the carriage 90, at which time it will propel the carriage and lift the counter-weight 108 so that the skip will move onto and over the hump of the track and dump its contents into the chute 132 so that the fish will be deposited above the dam 10. The arrival of the skip 30 at the top end of the track 14 will depress the limit lever 76 which will close the limit switch 72 and energize the actuator to move the switch 66 to inoperative position and deenergize the motor 64 so that the weight 108 may propel the skip 30 over the hump so that it will descend the track 14 under the force of gravity, unwinding the cable 50 from the drum 60.

It will thus be seen that this invention provides an expeditious and efficient means for lifting fish over a dam without injury to the fish and with a minimum expenditure of energy.

While for purposes of exemplification a particular embodiment of the invention has been shown and described according to the best present understanding thereof, it will be apparent to those skilled in the art, that changes and modifications can be made therein, without departing from the true spirit of this invention.

Having described the invention, what is claimed as new is:

1. A hoist for elevating fish over a dam comprising means for concentrating fish at the base of the dam, a pair of parallel tracks extending from the base, the top of said tracks curving over the top of the dam, a skip having a trap door in the bottom thereof, rollers journaled on said skip and mounted in said tracks, a cable attached to said skip, sheaves mounted on said tracks for entraining said cable, a power driven winch tensioning said cable to pull said skip up said track and onto said curved top, a chute adjacent the end of said track, a limit switch at the end of said track, said switch being operated by said skip to terminate power application to said winch.

2. A hoist for elevating fish over a dam comprising means for concentrating fish at the base of the dam, a pair of parallel tracks extending from the base, the top of said tracks curving over the top of the dam, a skip having a trap door in the bottom thereof, rollers journaled on said skip and mounted in said tracks, a cable attached to said skip, sheaves mounted on said tracks for entraining said cable, a power driven winch tensioning said cable to pull said skip up said track and onto said curved top, a chute adjacent the end of said track, a limit switch at the end of said track, said switch being operated by said skip to terminate power application to said winch, a weight biased carriage for returning said skip off said curved top.

3. A fish hoist comprising means for collecting fish to be hoisted, a pair of inclined hollow tracks, a skip, a pair of transverse axles journaled on said skip, rollers on said axles received in said hollow tracks, doors in said skip for admitting fish into said skip, said tracks including a curved portion for dumping said skip, a chute for receiving the material dump from said skip, a cable attached to said skip, a winch for winding up said cable, sheaves entraining said cable whereby said cable carries said skip onto said curved top, a switch responsive to the presence of the skip at the bottom of the track for starting said winch, a switch responsive to the presence of the said skip at the top of said track for stopping said winch, means for moving said skip off the top of said track.

4. A fish hoist comprising means for collecting fish to be hoisted, a pair of inclined hollow tracks, a skip, a pair of transverse axles journaled on said skip, rollers on said axles received in said hollow tracks, doors in said skip for admitting fish into said skip, said tracks including a curved portion for dumping said skip, a chute for receiving the material dumped from said skip, a cable attached to said skip, a winch for winding up said cable, sheaves entraining said cable whereby said cable carries said skip onto said curved top, a switch responsive to the presence of the skip at the bottom of the track for starting said winch, a switch responsive to the presence of said skip at the top of said track for stopping said winch, a carriage mounted in said tracks at the top end, a stop fixed on said track, means on said carriage engaging said stop, means biasing said carriage against said stop, means on said skip engaging said carriage, said biasing means being operative to move said carriage and said skip on the top of said track.

5. A fish hoist comprising a pair of channel rails extending up the face and curving over the top of a dam, a skip having closed side walls, a trap door bottom in said skip, a pair of axles journaled on said skip, rollers on said axles received in said channel rails, sheaves mounted between the tracks adjacent the curved portion thereof, a cable attached to said skip and received in said sheaves, a power driven winch tensioning said cable to lift said skip up said rails and onto said curved portion, to dump said skip, a chute receiving the contents of said skip, a trip lever actuated by said skip at the upper end of said rails to deenergize said winch, means for propelling said skip off said curved top of said rails, a trip lever at the bottom end of said rails, said skip engaging said trip lever to energize said winch.

6. A hoist including a pair of upwardly extending channel rails terminating in a curved top portion, a skip, a pair of axles on said skip, rollers on said axles mounted in said rails, a winch to propel said skip up said rails, a carriage mounted in the top end of said rails, a stop fixed below said rails, means on said carriage engaging said stop to limit the path of travel of said carriage, means yieldingly urging said carriage against said stop, means on said skip engaging said carriage to propel it away from said stop to the end of said rails, trip means engaging said skip adjacent the end of said rails to deenergize said winch, said carriage being operative to propel said skip reversely off said curved rails, said skip descending said rails under the influence of gravity after being propelled off said curved portion.

7. A hoist for elevating fish over a dam, including a pair of channel rails, a skip, a pair of axles on said skip, rollers on said axles received in said rails, said rails extending up the face of the dam and curving over the top thereof, a cable attached to said skip, a plurality of sheaves entraining said cable adjacent the curving portion of said rails and at the top end thereof, a winch, said cable connected to said winch, an electric motor operatively connected to said winch, a control switch for said motor, actuating means for said switch for said motor, actuating means for said switch, a lever mounted adjacent the bottom of said rails, said skip contacting said lever, said lever operatively connected to a starting switch, said starting switch energizing said actuating means to move said control switch to energize said motor, a stop switch, a trip lever mounted adjacent the top of said rails, said skip operating said trip lever, said trip lever actuating said stop switch, said stop switch energizing said actuating means to move said control switch to deenergize said motor.

8. A fish hoist comprising a pair of channel rails extending up the face and curving over the top of a dam, a skip having closed side walls, a trap door bottom in said skip, a pair of axles journaled on said skip, rollers on said axles received in said channel rails, sheaves mounted between the tracks adjacent the curved portion thereof, a cable attached to said skip and received in said sheaves, a power driven winch tensioning said cable to lift said skip up said rails and onto said curved portion, to dump said skip, a chute receiving the contents of said skip, a carriage mounted in the top end of said rails, a stop fixed below said rails, means on said carriage engaging said stop to limit the path of travel of said carriage, means yieldingly urging said carriage against said stop, means on said skip engaging said carriage to propel it away from said stop to the end of said rails, trip means engaging said skip adjacent the end of said rails to deenergize said winch, said carriage being operative to propel said skip reversely off said curved rails, said skip descending said rails under the influence of gravity after being propelled off said curved portion.

TOD M. DATE.

REFERENCES CITED

The following references are of record in the file of this patent:

UNITED STATES PATENTS

| Number | Name | Date |
| --- | --- | --- |
| 1,579,105 | Green | Mar. 30, 1926 |
| 1,903,627 | Koch | Apr. 11, 1933 |
| 2,071,670 | Warner | Feb. 23, 1937 |